United States Patent [19]
New et al.

[11] Patent Number: 5,916,465
[45] Date of Patent: Jun. 29, 1999

[54] TORCH

[75] Inventors: Kent Miles New; Dale Robert Bervig, both of Wichita, Kans.

[73] Assignee: Tweco Products, Inc., Wichita, Kans.

[21] Appl. No.: 08/951,553

[22] Filed: Oct. 16, 1997

[51] Int. Cl.⁶ .................................................. B23K 9/28
[52] U.S. Cl. ............................. 219/138; 219/75; 219/136
[58] Field of Search ...................... 219/75, 136, 137.31, 219/138, 68

[56] References Cited

U.S. PATENT DOCUMENTS

| | | | |
|---|---|---|---|
| 2,797,301 | 6/1957 | Copleston ................................... | 219/75 |
| 3,109,916 | 11/1963 | Kilburn et al. ............................ | 219/75 |
| 3,263,056 | 7/1966 | Tallman ..................................... | 219/75 |
| 3,909,585 | 9/1975 | Sanders et al. . | |
| 4,218,605 | 8/1980 | Hoffman et al. . | |
| 4,268,740 | 5/1981 | Sanders . | |
| 4,361,747 | 11/1982 | Torrani ..................................... | 219/136 |
| 4,443,683 | 4/1984 | Watts ......................................... | 219/74 |
| 5,338,917 | 8/1994 | Stuart et al. . | |
| 5,491,231 | 2/1996 | Stuart et al. . | |

OTHER PUBLICATIONS

Weldcraft Products, Inc.; Product Literature entitled, "Incredible"; Published at least as early as Oct. 16, 1997; 2 pages.

ESAB; Product literature entitled, "FLEXLOCK—La torcia TIG in grado di assumere qualsiasi posizione"; Published at least as early as Oct. 16, 1997; 2 pages.

*Primary Examiner*—Clifford C. Shaw
*Attorney, Agent, or Firm*—Senniger, Powers, Leavitt & Roedel

[57] ABSTRACT

A torch for cutting, gouging or welding metal including a body having a central longitudinal axis for connection to sources of pressurized gas and electrical potential and a swivel housing threadably connected to the body for rotation relative to the body about the axis and a tubular handle around the body and the swivel housing. The handle has front and rear sections manually relatively rotatable. The front section and swivel housing are rotatable as a unit, and the rear section and body are rotatable as a unit so that rotation of one section relative to the other effects rotation of the swivel housing relative to the body. The torch includes a head forward of the swivel housing having an opening for holding an electrode and includes an elongate unitary swivel member having a forward end non-rotatably attached to the head and a rearward swivel end disposed in an opening of the swivel housing. The swivel end of the swivel member is rotatable on the axis and swivelable in the housing opening to position the head in a selected angular position. The torch includes a locking system responsive to manual rotation of the front and rear handle sections relative to one another to releasably hold the swivel end of the swivel member fixed in the housing opening to lock the head in the selected position and an enlarged gripping formation on the front handle section.

12 Claims, 4 Drawing Sheets

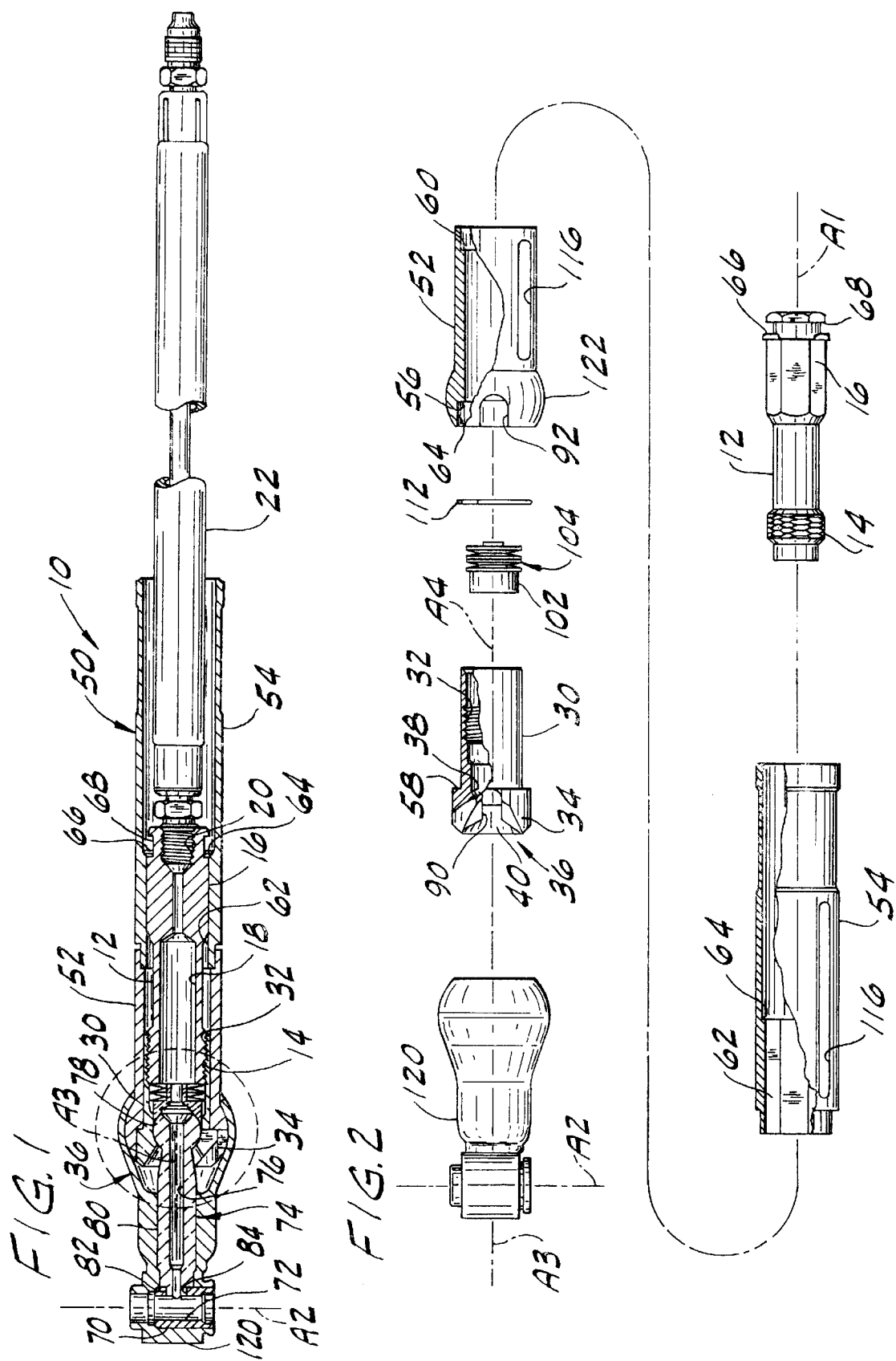

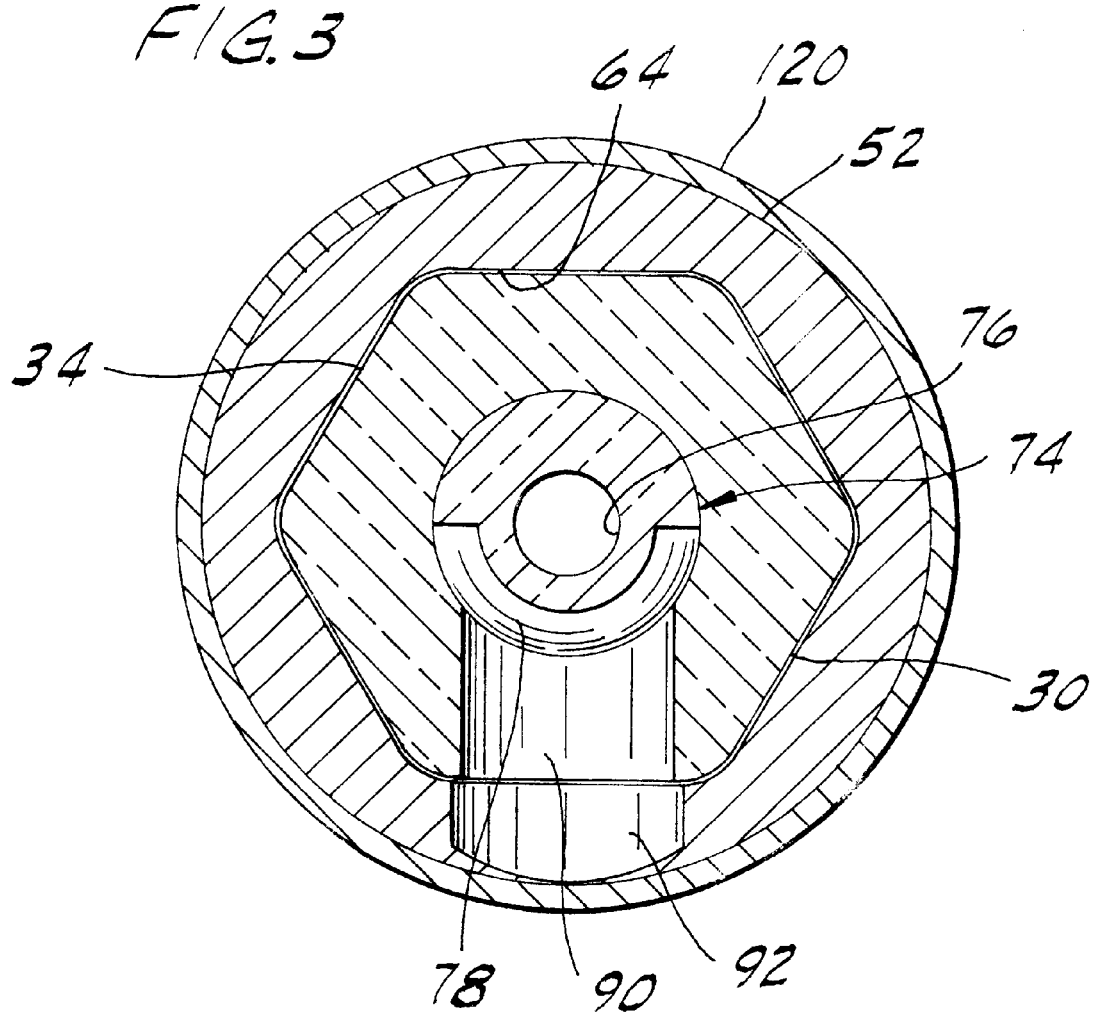

5,916,465

TORCH

BACKGROUND OF THE INVENTION

This invention relates generally to torches used in cutting, gouging and/or welding operations and, more particularly, to a torch with an adjustable joint which enables the head of the torch to be moved to a selected position and then easily and securely locked in place.

Reference may be made to U.S. Pat. No. 4,268,740 for a patent generally in the field of this invention.

SUMMARY OF THE INVENTION

Among the several objects of this invention may be noted the provision of a torch which has an improved swivel joint which allows the head of the torch to be positioned in a selected angular position and then locked in place quickly and easily; the provision of such a torch where the head of the torch does not tend to unthread from the swivel joint when the swivel joint is tightened and loosened; the provision of such a torch having an ergonomic gripping feature which facilitates tightening and loosening of the swivel joint and makes the torch easier to hold and manipulate; the provision of such a torch which is designed for quick and easy changeover from one torch head size to another; and the provision of such a torch which is durable.

In general, a torch of this invention comprises a body having a central longitudinal axis adapted for connection to sources of pressurized gas and electrical potential. The torch also includes a swivel housing threadably connected to the body for rotation relative to the body about the axis and a tubular handle around the body and the swivel housing. The handle has front and rear sections manually rotatable relative to one another. The front section and swivel housing are rotatable as a unit, and the rear section and body are rotatable as a unit so that rotation of one section relative to the other effects rotation of the swivel housing relative to the body. Moreover, the torch includes a head forward of the swivel housing having an opening for holding an electrode. The torch also includes an elongate unitary swivel member having a forward end non-rotatably attached to the head and a rearward swivel end disposed in an opening of the swivel housing. The swivel end of the swivel member is rotatable on the axis and swivelable in the housing opening to position the head in a selected angular position. Furthermore, the torch includes a locking system responsive to manual rotation of the front and rear handle sections relative to one another to releasably hold the swivel end of the swivel member fixed in the housing opening to lock the head in the selected position. The torch also includes an enlarged gripping formation on the front handle section.

Other objects and features will in part apparent and in part pointed out hereinafter.

BRIEF DESCRIPTION OF THE DRAWINGS

FIG. 1 is a vertical cross section of a torch of the present invention shown connected to a welding cable;

FIG. 2 is a side elevation of the torch shown disassembled and in partial section;

FIG. 3 is a cross section taken in the plane of line 3—3 of FIG. 4;

Corresponding parts are designated by corresponding reference numerals throughout the several views of the drawings.

DETAILED DESCRIPTION OF THE PREFERRED EMBODIMENT

Figure 4:
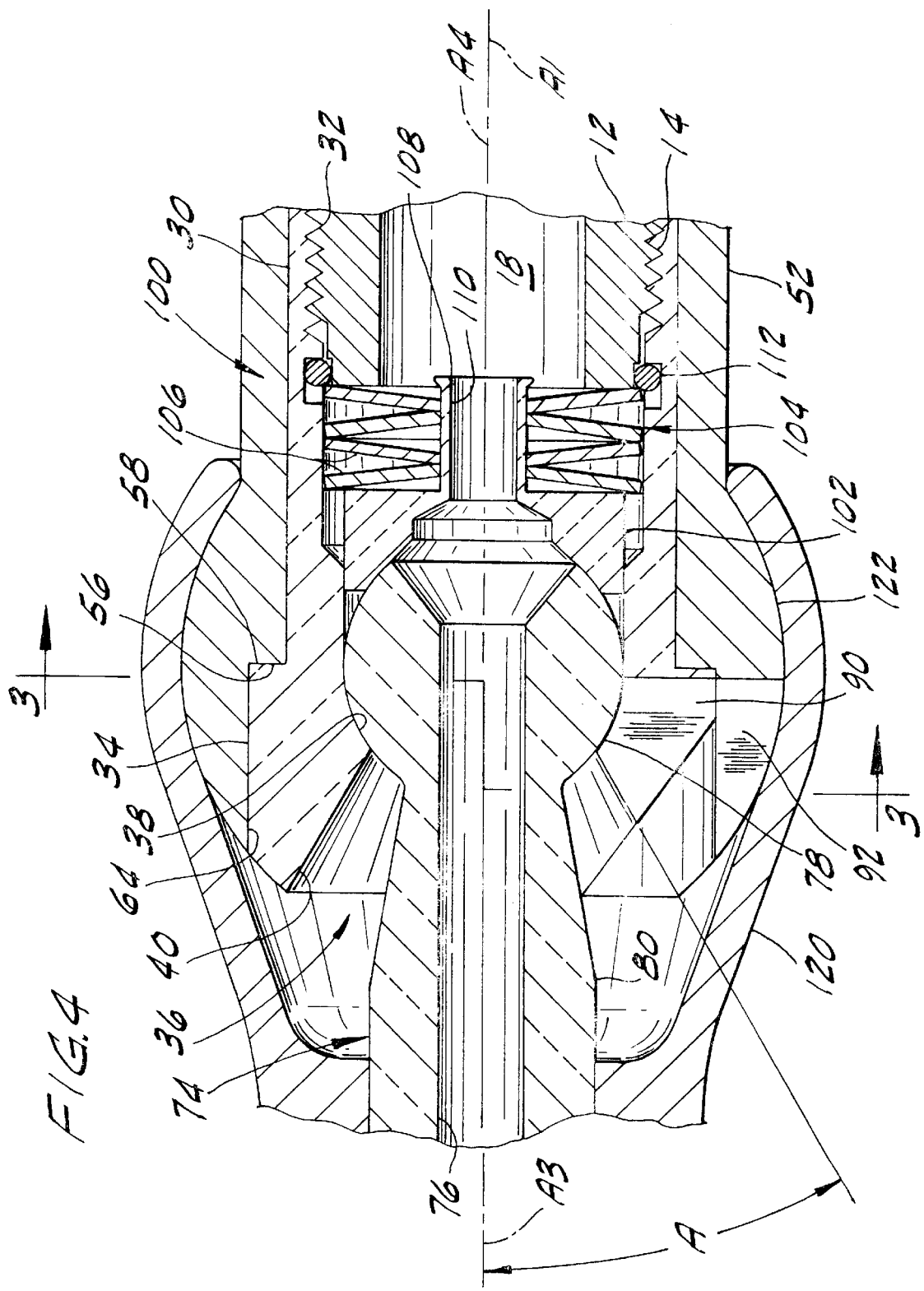
FIG. 4 is a detail of the torch showing a central axis of a head of the torch aligned with a central axis of a swivel housing of the torch.

Referring now to the drawings, and more particularly to FIG. 1, a torch of the present invention is indicated in its entirety by the reference numeral 10. The torch 10 illustrated is a TIG (tungsten inert gas) torch used for welding, but it will be understood that this invention is applicable to other types of torches used to cut, gouge and/or weld metal.

As illustrated in FIG. 1, the torch 10 comprises a generally cylindric metal body 12 having external threads 14 adjacent its forward end (left end as viewed in FIG. 1) , wrench flats 16 adjacent its rearward (right) end, and a central longitudinal axis A1 (FIG. 2). The body 12 has an axial passage 18 therethrough and internal threads 20 adjacent its rearward end for connecting the torch 10 to a conventional power cable assembly or cable-hose 22 adapted for connection to a source of pressurized gas and a source of electrical potential, as will be understood by those skilled in this field. (Neither source is shown in the drawings.)

A tubular swivel housing 30 having internal threads 32 adjacent its rearward end is threadably connected to the external threads 14 adjacent the forward end of the body 12 for rotation relative to the body about the axis A1 (FIG. 2) of the body. As best shown in FIG. 2, the forward or head end of the swivel housing 30 is of increased diameter and has a polygonal (e.g., hexagonal) outer surface 34. The housing 30 has a swivel opening, generally designated 36, adjacent its forward end defined by a spherically rounded internal surface which forms a socket 38 inside the swivel housing, and a conical surface 40 diverging in a forward direction away from the socket. In the preferred embodiment, the conical surface 40 is coaxial with the axis A1 of the torch body 12.

As illustrated in FIG. 1, the torch 10 also includes a tubular handle, generally designated 50, around the body 12 and the swivel housing 30. The handle 50 has front and rear sections designated 52 and 54, respectively. The rearward end of the front handle section 52 overlaps the forward end of the rear handle section 54. As shown in FIG. 2, the front handle section 52 has a forward internal annular shoulder 56 which abuts an external shoulder 58 on the swivel housing 30 and a rear internal annular shoulder 60 which faces the front end of the rear handle section 54. As a result, the front handle section 52 is held captive against longitudinal movement relative to the swivel housing 30 and body 12 of the torch 10. The overlapping portions of the front and rear handle sections 52, 54 are circular in shape to permit the handle sections to be manually rotated relative to one another. The front handle section 52 forward of shoulder 56 has an internal surface 64 of polygonal shape to match and mate with the polygonal outer surface 34 of the swivel housing 30 so that the two parts rotate together as a unit (i.e., conjointly). Thus, the front handle section 52 and swivel housing 30 have slidably interengageable surfaces which allow the swivel housing to be slidably removed from the front handle section. Similarly, the rear handle section 54 has an internal surface 62 (FIG. 1) adjacent its forward end which is configured to match and mate with the wrench flats 16 on the body 12 so that these two parts rotate together as a unit. The rear handle section 54 also has an internal annular shoulder 64 which abuts a split ring 66 secured in a groove 68 formed in the body 12 to hold the rear handle section captive against longitudinal movement relative to the body. Manual rotation of one handle section (e.g., the front handle section 52) relative to the other handle section (e.g., the rear handle section 54) effects rotation of the swivel housing 30 relative to the body 12. This in turn causes the swivel housing 30 to move axially relative to the body 12 which is significant for reasons which will become apparent.

As further shown in FIG. 1, the torch 10 further comprises a cylindric metal head 70 forward of the swivel housing 30 having an opening 72 therethrough for holding an electrode (not shown) at an angle relative to the body 12. The torch head 70 is attached to the swivel housing 30 by means of an elongate unitary (i.e., one-piece) swivel member, generally designated 74, having a central passage 76 therethrough. As shown in FIG. 1, the head 70 has a central axis A2 which is disposed at 90 degrees relative to a central axis A3 of the swivel member 74. In an alternate embodiment (not shown), the central axis of the head may be parallel to the central axis of the swivel member. The swivel member 74 has a spherical rearward swivel end 78 received in the socket 38 of the swivel housing 30. A stem 80 extends forward from the swivel end 78 and terminates in a reduced diameter forward end 82 which is received by a radial hole 84 in the cylindric wall of the head 70. The passage 76 through the swivel member 74 communicates with the opening 72 through the head 70 so that pressurized gas is delivered to the head. The forward end 82 of the swivel member 74 is non-rotatably attached, as by brazing, to the head 70 so that the swivel member and head cannot rotate relative to one another. The swivel member 74 is rotatable 360 degrees in the socket 38 about the central axis A4 (FIG. 2) of the housing 30, and is also swivelable 30 degrees in the socket to position the head 70 of the torch 10 in a selected angular position relative to the handle 50 as shown in FIG. 5. The swivel angle (i.e., the angle A in FIG. 4 between the conical surface 40 of the swivel housing 38 and the central axis A4 (FIG. 2) of the housing) is preferably about 30 degrees, but this angle may vary. The swivel member 74 may be pivoted to an even greater swivel angle (e.g., up to about 80 degrees) at one location by providing aligned notches 90, 92 in the forward ends of the swivel housing 30 and front handle section 52, respectively. The swivel member 74 is capable of being pivoted into these notches 90, 92 to achieve the greater swivel angle.

Figure 5:
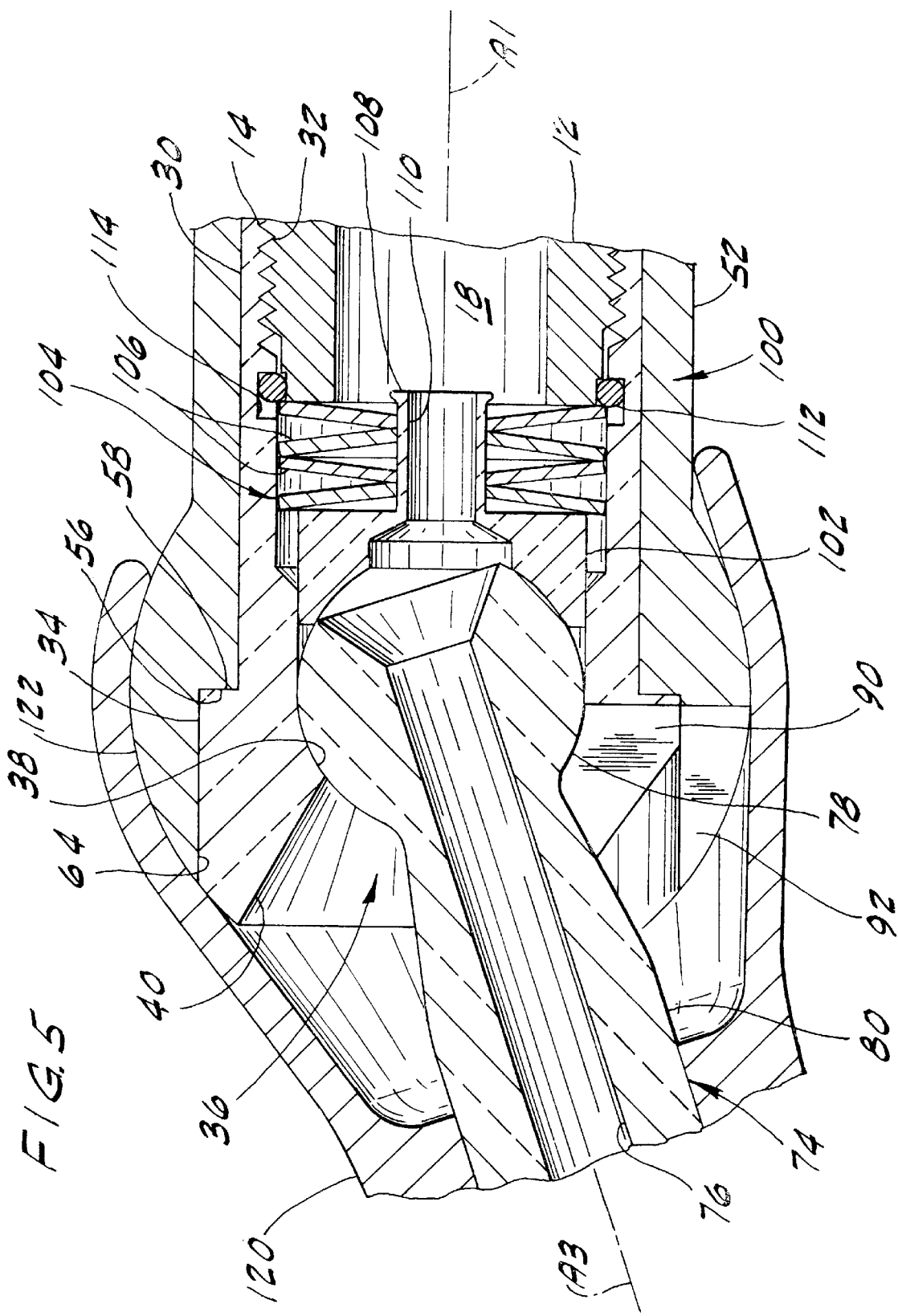
FIG. 5 is a detail similar to FIG. 4 except showing the axis of the head positioned at an angle with respect to the axis of the swivel housing.

As illustrated in FIG. 4, a locking system, generally designated 100, is provided for releasably holding the swivel end 78 of the swivel member 74 fixed in the socket 38 of the swivel housing 30, thus locking the head 70 of the torch 10 in a selected position of adjustment relative to the handle 50. This system 100 is similar to the system described in U.S. Pat. No. 4,268,740, which is incorporated herein by reference. The system 100 comprises a swivel seat 102 disposed between the swivel end 78 of the swivel member 74 and the forward end of the body 12, and a spring mechanism, generally designated 104, connected to the seat. The spring mechanism 104 comprises a series of annular springs 106 (e.g., four Belleville or coned springs) rotatably attached to a cylindric stem 108 extending rearwardly from the swivel seat 102.

The spring mechanism 104 is positioned between the forward end of the body 12 and the rearward face of the swivel seat 102. The arrangement is such that manual rotation of the front and rear handle sections 52, 54, respectively, relative to one another in one direction (e.g., rotating the rear handle section clockwise, aft looking forward, relative to the front handle section) causes the body 12 to move axially forward in the swivel housing 30 so the forward end of the body compresses the spring mechanism 104 into substantial pressure engagement with the swivel seat 102 to lock the swivel member 74 in position due to friction between the swivel end and the socket and seat. Rotation of the front and rear handle sections 52, 54 relative to one another in the opposite direction (e.g., rotating the rear handle section counter-clockwise, aft looking forward, relative to the front handle section) causes the body 12 to move axially rearward to relieve the pressure between the swivel end 78 and the swivel seat 102 so the head 70 of the torch 10 can be rotated or swiveled to another position.

The swivel seat 102 and stem 108 have a passage 110 therethrough which aligns with the passage 18 in the body 12 and the passage 76 through the swivel member 74 to deliver gas to the head 70. It will be noted in this regard that the rearward end of the swivel member passage 76 is enlarged to ensure unobstructed gas flow regardless of the angle between of the swivel member axis A3 and the body axis A1. The swivel seat 102 and spring mechanism 104 are retained in position within the swivel housing 30 by a split ring 112 held by a groove 114 in the housing. To facilitate rotation of the front and rear handle sections 52, 54 relative to one another, the outer surfaces of the front and rear handle sections are formed with axially extending grooves 116 (FIG. 2) at appropriate intervals around the handle 50 for providing better gripping surfaces.

A flexible cover 120 of resilient insulating material (e.g., silicone rubber) covers the head 70 of the torch 10, the swivel member 74, and a spherical portion 122 of the front handle section 52. The portion of the cover 120 surrounding the spherical portion 122 of the front handle section is also spherical to permit the head 70 to rotate and swivel relative to the handle 50. Moreover, it will be noted that the enlarged spherical portion 122 significantly increases the mechanical advantage available for facilitating manual rotation of the front and rear handle sections 52, 54 relative to one another. Further, the spherical shape of the handle portion 122 and cover 120 provides an enlarged gripping formation sized to fit comfortably in the hand which makes the torch 10 easy to hold and manipulate during operation.

Preferably, the cover 120 is a unitary boot which is molded around the head 70 and swivel member 74. Before the cover 120 is molded around the head 70 and swivel member 74, the swivel member is inserted into the interior of the swivel housing 30 from the rearward end of the housing and slid forward until the socket 38 in the housing receives the swivel end 78. Then the head 70 is brazed to the swivel member 74, and the swivel seat 102 and spring mechanism 104 are installed in the housing 30 and held in place with the split ring 112.

It will be observed from the foregoing that the torch 10 of the present invention is easy to use and that the head 70 of the torch is readily adjustable to different positions. It will be noted in this regard that adjustment is easily accomplished by grasping the front handle section 52 with one hand while holding the rear handle section 54 firmly in the other hand. The two handle sections are rotated relative to one another in a first direction. This operates in the manner described above to release the swivel end 78 so that the swivel member 74 may move in the swivel socket 38. The head 70 of the torch 10 is rotated and/or swivelled to a desired position and locked in place by rotating the two handle sections 52, 54 relative to one another in the opposite direction to securely tighten the swivel end 78 in the socket 38.

The present design is further advantageous over certain prior art designs in which the swivel member is threadably attached to the head of the torch. This construction resulted in a tendency of the head to unscrew and become loose during tightening and/or loosening of the swivel member. This problem is overcome in the present design because the swivel member 74 is of unitary design and non-rotatably attached to the head 70 of the torch 10. Consequently, the head 70 cannot unthread from the swivel member 74; the swivel member cannot become loose; and there is no need to hold the head stationary during tightening and loosening of the swivel member.

The design of the present invention also allows a welder to easily change from one head (e.g., a 150-amp head) to a head of different size or type (e.g., an 80-amp head) because the swivel housing 30, swivel member 74, head 70 and cover 120 are separable as a unit from the handle 50 and body 12 of the torch 10. This is accomplished by slipping the flexibly resilient cover 120 off the spherical portion 122 of the front handle section 52 and then rotating the front and rear handle sections relative to one another until the swivel housing 30 unscrews from the body 12 of the torch 10. The entire assembly of the swivel housing 30, swivel member 74, head 70 and cover 120 can then be removed for replacement or repair.

Still another advantage of the present design is that, unlike certain prior torches, the cover 120 is securely held in place by the spherical portion 122 of the front handle section 52. Thus, unlike certain prior designs, the cover 120 is much less likely to be pulled out of position to expose metal surfaces of the torch 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A torch for cutting, gouging or welding metal, comprising
  a body having a central longitudinal axis, said body being adapted for connection to a source of pressurized gas and a source of electrical potential,
  a swivel housing threadably connected to a forward end of the body for rotation relative to the body about said axis,
  a tubular handle around the body and the swivel housing, said handle having front and rear handle sections manually rotatable relative to one another, the front handle section and the swivel housing being rotatable as a unit and the rear handle section and the body being rotatable as a unit whereby manual rotation of one handle section relative to the other handle section effects rotation of the swivel housing relative to the body,
  the swivel housing having a swivel opening adjacent a forward end thereof,
  a head forward of the swivel housing having an opening therethrough for holding an electrode at an angle relative to the axis of the body,
  an elongate unitary swivel member having a forward end non-rotatably attached to the head of the torch and a rearward swivel end disposed in said swivel housing opening, the swivel end of the swivel member being rotatable on said axis and swivelable in the housing opening to position the head of the torch in a selected angular position,
  a locking system responsive to manual rotation of the front and rear handle sections relative to one another to releasably hold the swivel end of the swivel member fixed in said housing opening thereby to lock the head of the torch in said selected position, and
  an enlarged gripping formation on the front handle section for facilitating manual rotation of the front and rear handle sections relative to one another.

2. A torch as set forth in claim 1 wherein said enlarged gripping formation is part-spherical in shape and sized to fit comfortably in the hand while providing a significant mechanical advantage for rotating the front and rear handle sections relative to one another.

3. A torch as set forth in claim 1 further comprising a flexible insulating cover covering the head of the torch, the swivel member, and the enlarged gripping formation.

4. A torch as set forth in claim 3 wherein the swivel housing, swivel member, head and cover are separable as a unit from the handle and the body of the torch.

5. A torch as set forth in claim 4 wherein the swivel housing and the front handle section have slidably interengageable surfaces which prevent relative rotation therebetween but which allow the swivel housing to be slidably removed from the front handle section.

6. A torch as set forth in claim 4 wherein said cover is a one-piece molded boot of resiliently flexible material.

7. A torch as set forth in claim 1 wherein said swivel housing has an internal rounded surface defining a socket in said housing opening and a conical surface diverging in a forward direction away from said socket to provide clearance sufficient to permit 360 degree angular swivel movement of the swivel member.

8. A torch as set forth in claim 7 wherein said conical surface is coaxial with the axis of the torch body, and wherein the included angle between the conical surface and said axis is about 30 degrees.

9. A torch as set forth in claim 1 wherein said locking system comprises a swivel seat disposed in the swivel housing between the swivel end of the swivel member and the body of the torch, and a spring mechanism urging the swivel seat against the swivel end of the swivel member to hold the swivel end fixed in the swivel opening, the arrangement being such that rotation of the front and rear handle sections relative to one another in one direction operates to move the body in a forward direction relative to the swivel housing until the body compresses the spring mechanism into substantial pressure engagement with the swivel seat to lock the swivel member in position, and rotation of the front and rear handle sections relative to one another in an opposite direction operates to move the body in a rearward direction to permit the spring mechanism to expand out of substantial pressure engagement with the swivel seat to permit the swivel member to be moved in the swivel opening.

10. A torch for cutting, gouging or welding metal, comprising
  a body having a central longitudinal axis, said body being adapted for connection to a source of pressurized gas and a source of electrical potential,
  a swivel housing threadably connected to a forward end of the body for rotation relative to the body about said axis,
  a tubular handle around the body and the swivel housing, said handle having front and rear handle sections manually rotatable relative to one another, the front handle section and the swivel housing being rotatable as a unit and the rear handle section and the body being rotatable as a unit whereby manual rotation of one handle section relative to the other handle section effects rotation of the swivel housing relative to the body, the swivel housing having a swivel opening adjacent a forward end thereof, a head forward of the swivel housing having an opening therethrough for holding an electrode at an angle relative to the axis of the body, an elongate unitary swivel member having a forward end non-rotatably attached to the head of the torch and a rearward swivel end disposed in said swivel housing opening, the swivel end of the swivel member being rotatable on said axis and swivelable in the housing opening to position the head of the torch in a selected angular position, a locking system responsive to manual rotation of the front and rear handle sections relative to one another to releasably hold the swivel end of the swivel member fixed in said housing opening thereby to lock the head of the torch in said selected position, and a flexible insulating cover covering the head of the torch, the swivel member, and a forward end of the front handle section.

11. A torch as set forth in claim 10 further comprising an enlarged gripping formation on the front handle section for facilitating manual rotation of the front and rear handle sections relative to one another, and wherein said insulating cover removably fits over said enlarged gripping formation.

12. A torch as set forth in claim 11 wherein the swivel housing, swivel member, head and cover are separable as a unit from the handle and body of the torch.

* * * * *